United States Patent
Smallman et al.

(10) Patent No.: US 9,044,726 B2
(45) Date of Patent: Jun. 2, 2015

(54) METHOD OF CLADDING DIAMOND SEEDS

(75) Inventors: Clint Guy Smallman, Randburg (ZA);
Geoffrey John Davies, Randburg (ZA);
Johannes Lodewikus Myburgh, Helderkruin (ZA)

(73) Assignee: Element Six Abrasives S.A., Luxembourg (LU)

( * ) Notice: Subject to any disclaimer, the term of this patent is extended or adjusted under 35 U.S.C. 154(b) by 1314 days.

(21) Appl. No.: 11/916,148

(22) PCT Filed: May 26, 2006

(86) PCT No.: PCT/IB2006/001370
§ 371 (c)(1),
(2), (4) Date: Mar. 3, 2008

(87) PCT Pub. No.: WO2006/129155
PCT Pub. Date: Dec. 7, 2006

(65) Prior Publication Data
US 2008/0219914 A1    Sep. 11, 2008

(30) Foreign Application Priority Data

May 31, 2005  (ZA) .................................. 2005/04447

(51) Int. Cl.
*B01J 3/06*        (2006.01)
*E21B 10/36*    (2006.01)
(Continued)

(52) U.S. Cl.
CPC ............ *B01J 3/062* (2013.01); *B01J 2203/061* (2013.01); *B01J 2203/062* (2013.01); *B01J 2203/0655* (2013.01); *B01J 2203/068* (2013.01)

(58) Field of Classification Search
None
See application file for complete search history.

(56) References Cited

U.S. PATENT DOCUMENTS 4,518,659 A      5/1985   Gigl et al.
4,907,377 A *   3/1990   Csillag et al. .................. 51/309
(Continued)

FOREIGN PATENT DOCUMENTS

| EP | 0 737 510 | 10/1996 |
| JP | 1-284330 A | 11/1989 |
| WO | 99 29411 | 6/1999 |

OTHER PUBLICATIONS

Hwang et al.; Metal-Sulfur-COH-Silicate Fluid Mediated Diamond Nucleation in Kokchetav UltraHigh-Pressure Gneiss; Eur. J. Mineral; 15, 503-511;2003.*

(Continued)

*Primary Examiner* — Guinever Gregorio
(74) *Attorney, Agent, or Firm* — Oblon, McClelland, Maier & Neustadt, L.L.P.

(57) ABSTRACT

The invention relates to a method for manufacture of diamond, the method including the steps of providing a first coating of solvent metal or solvent metal alloy on a diamond seed to create a coated diamond seed, situating the coated diamond seed adjacent a catalyst system comprising a solvent metal and/or a source of carbon, and subjecting the coated diamond seed and catalyst system to increased temperature wherein the melting point of the first coating is at least 20 deg C. below that of the catalyst system. The invention further relates to a compact comprising a plurality of diamond seeds wherein at least one seed includes a first coating comprising a solvent metal and/or solvent metal based alloy, the compact further comprising a catalyst system comprising a solvent metal and/or a source of carbon wherein the melting point of the first coating is at least 20 deg C. below that of the catalyst system.

5 Claims, 3 Drawing Sheets

(51) Int. Cl.
*E21B 17/10* (2006.01)
*B32B 5/16* (2006.01)
*B32B 13/04* (2006.01)
*B24D 3/02* (2006.01)
*B24D 11/00* (2006.01)
*C09C 1/68* (2006.01)
*C30B 19/00* (2006.01)
*C30B 28/06* (2006.01)

(56) References Cited

U.S. PATENT DOCUMENTS

| | | | |
|---|---|---|---|
| 5,232,469 A | | 8/1993 | McEachron et al. |
| 5,250,086 A | * | 10/1993 | McEachron et al. ............ 51/309 |
| H1358 H | | 9/1994 | Ferrando et al. |
| 6,835,365 B1 | * | 12/2004 | Davies et al. ................. 423/446 |
| 2004/0076748 A1 | * | 4/2004 | Fries et al. .................... 427/212 |
| 2004/0112359 A1 | | 6/2004 | Sung |
| 2007/0295267 A1 | * | 12/2007 | Sung ............................... 117/64 |

OTHER PUBLICATIONS

Smirnov et al.; Effect of Cladding Diamond Powder With a Nickel-Phosphorous Alloy on Its High-Temperature Oxidation; Powder of Metallurgy and Metal Ceramics, vol. 35. Nos. 1-2; 1996.*

Translation JP 01284330; 1989.*

Liu, X. F., et al.,"The Micronanalysis of the Bonding Condition Between Coated Diamond and Matrix", The International Journal of Refractory Metals and Hard Materials, Elsevier Publishers, vol. 21, No. 3-4, pp. 1 to 10, 2003.

Japanese Office Action issued Mar. 23, 2012 in patent application No. 2008-514215 with English translation.

* cited by examiner

METHOD OF CLADDING DIAMOND SEEDS

INTRODUCTION

This invention relates to a method of manufacturing diamond including the step of cladding or coating diamond seeds. In particular this method relates to a method of manufacturing diamond including the step of cladding diamond seeds using relatively low melting point alloys.

BACKGROUND TO THE INVENTION

The use of compacts comprising essentially a source of carbon (typically graphite) and suitable metals and their alloys as reaction volumes for diamond synthesis under high-pressure, high-temperature (HPHT) conditions is well known in the art. The metals are typically selected from iron, nickel, chromium, manganese and cobalt, and/or alloys of these, and they are thought to have a dual solvent/catalyst function under UHPT conditions, serving to dissolve the carbon source and promote diamond growth. Typically, small diamond particles are disposed throughout such reaction volume compacts (RVC) in order to seed diamond growth. An essential element of using such RVC's is the heating of said compacts at elevated temperatures (typically >500 degrees Celcius (deg C.), and more typically > about 900 deg C. but < about 1200 deg C.) in a chosen atmosphere and/or relatively low pressure environment in order to reduce the oxygen and nitrogen content within the compact prior to the diamond synthesis process.

As taught by EP0737510 B1 (Sumitomo), there are certain advantages to manufacturing the RVC using granules comprising coated diamond seed particles, where the coating comprises at least one type of solvent metal powder, a source of carbon for the diamond growth (specifically a graphitic source), and possibly an organic binder material. Such granules may be compacted so as to yield an RVC in which the fine diamond seeds are arranged in a regular array or at least separated by a certain minimum distance from each other. Using such compacts to synthesize diamond, as is well known in the art and discussed in EP0737510 B1, has the potential to yield an increased quantity of high quality diamond than would be the case if the seed diamond were randomly distributed throughout the compact.

One of the embodiments of the invention disclosed in EP0737510 B1 is a granule form where the seed diamond is coated or clad with metal using plating or Chemical Vapour Deposition (CVD) methods and wherein the coated seed is subsequently coated with a mixture of metal, graphite and binder material in various combinations. One advantage of coating or cladding the seed diamond with metal using a plating or CVD method prior to further coating using a fluidized bed method is that the resultant seed diamond/metal composite particle can be made significantly larger and heavier than the seed diamond itself, thereby facilitating the subsequent fluidized bed coating or other coating method. This is especially true where the seed diamond needs to be as small as possible, typically less than about 0.2 mm in diameter. It is desirable to use as small seeds as possible in order to minimize the metallic inclusion uptake within the grown diamond crystals, as is the case in the commercial manufacture of high quality diamond grit less than about 2 mm in diameter.

Published patent application US20050136667 also discusses the cladding of seeds with a thick layer of solvent/catalyst metals, such as Co, Fe and Ni, in order to prevent direct contact between seeds and the surrounding carbon source. It is asserted in this reference that coatings of Ni or Ni alloys are preferred.

Patent JP59164607 (Showa Denko) claims that coating the diamond seed with a metal coating with very low concentration of oxygen and nitrogen creates the potential to make extremely pure diamond particles with reduced metallic inclusions.

An alternative method for achieving an RVC in which the seed diamond distribution is controlled, rather than random, is disclosed in the prior art. Specifically, patents EP0528195 B1 (Sumitomo) and U.S. Pat. No. 4,547,257 (Showa Denko) disclose methods pertaining to the placement of seed diamonds in two-dimensional arrays onto the surfaces of disc-like layers of various kinds, then arranging the discs on top of one another and compacting the resulting stack in order to create a compact in which the seed diamonds are arranged in a relatively ordered, non-random way relative to one another. The benefits of doing this are similar to those discussed above, with respect to the increased yield of high quality diamond arising from the synthesis process.

One significant disadvantage of coating or cladding the seed diamonds with a sufficiently thick layer of metal prior to disposal of the seeds within a synthesis reaction volume by any method such as those disclosed above is that the metal layer deleteriously perturbs the early stage growth of the diamond on the seed, as compared to the traditional approach where the seed diamond is not surrounded by predominantly metal layer but by a mixture of metal and graphite. This perturbation of the initial growth conditions is likely to alter the required synthesis process control conditions and/or the properties of the resultant grown diamond product. If the control conditions are not altered to compensate for the coating or cladding around the seeds, the resultant grown diamond is likely to be of inferior quality.

A need exists for the methods of the prior art not burdened by the perturbation of the initial growth conditions, as hereinbefore described.

SUMMARY OF THE INVENTION

According to a first aspect to the present invention there is provided a method for manufacture of diamond, the method including the steps of:
  providing a first coating of solvent metal or solvent metal alloy on a diamond seed to create a coated diamond seed;
  situating the coated diamond seed adjacent a catalyst system comprising a solvent metal and/or a source of carbon, and
  subjecting the coated diamond seed and catalyst system to increased temperature,
wherein the melting point of the first coating is at least 20 deg C. below that of the catalyst system.

The present invention thereby pertains to a method for reducing the deleterious effect of the solvent metal coating on seed diamonds on the synthesis process control conditions and the properties of the grown diamond, while maintaining the advantages imparted by the coating with respect to the relative ease of subsequent fluidized bed coating or other particle manipulation method, such as may be used to arrange the seed diamonds in two-dimensional arrays on various kinds of discs. The method according to the present invention may be used in conjunction with known methods for manufacturing diamond, for example, High Pressure, High Temperature (HPHT).

The solvent metals include nickel, cobalt, chromium, iron and manganese, or combinations of these. The first coating may comprise alloys of the abovementioned solvent metals with phosphorus, boron and/or sulphur. Other chemicals, such as oxygen and nitrogen, may also be present as impurities or deliberately incorporated.

Preferably solvent metal-based alloys with relatively low melting points (less than about 1000 deg C. at atmospheric pressure and in the presence of carbon) are used to coat the diamond seeds.

Any of the several methods known in the art for depositing the first coating on the diamond particles can be used (e.g. the electroless, electrolytic or the fluidised bed methods).

The first coating alloy should preferably be selected such that its melting point (the liquidus) in the presence of excess carbon is at least about 20 deg C. lower, more preferably at least 30 deg lower, more preferably at least 40 deg lower, more preferably at least 50 deg lower, more preferably at least 60 deg lower, more preferably at least 70 deg lower, more preferably at least 80 deg lower, more preferably at least 90 deg lower than that of the catalyst system in the presence of excess carbon, and most preferably about 100 deg C. lower or more.

Preferably, a second component of the first coating alloy (i.e. not the Ni or Co, both of which support the growth of diamond under diamond-stable conditions), should be as low as possible so as to minimise its effect on diamond growth.

Preferably, the thickness of the first coating should be sufficient to enable handling, granulation, placement or other manipulation of the seed as desired and described in the art, but no thicker than necessary for this purpose.

The most preferable first coating system is NiP. Preferably, the P content should be at least 6 weight percent (wt %), more preferably at least 7 wt % and not more than 14 wt %, preferably not more than 13 wt %. (i.e. in the range 6 to 14 wt %) of the NiP alloy. Most preferably, the P content should be in the range 7 to 13 wt % of the NiP alloy.

Using the CoP system, the P content should preferably be in the range 9 to 13 wt %.

Using the NiB system, the B content should preferably be in the range 8 to 16 wt % or 3 to 5 wt %, and most preferably in the range 10 to 16 wt %

Using the NiS system, the S content should preferably exceed 15 wt % and most preferably be in the range 19 to 40 wt %.

Without being bound by theory, it is believed that upon furnacing an RVC according to the invention at a temperature above the melting point of the selected first coating solvent alloy, the alloy melts and dissipates into the surrounding material, thereby reducing the amount of alloy metal separating the seed diamond from the source graphite. This has the effect of reducing the deleterious effect of the coating on the initial diamond growth conditions and hence the grown diamond properties without the need to modify the synthesis process control conditions to compensate for the existence of a substantial metal coating or cladding on the seed diamond.

According to a second aspect to the present invention, there is provided a diamond seed including a coating comprising a solvent metal and/or metal based alloy having a melting point less than 1100 deg C., and more preferably below about 1000 deg C.

According to a third aspect to the present invention there is provided a compact comprising a plurality of diamond seeds wherein at least one seed includes a first coating comprising a solvent metal and/or solvent metal based alloy, the compact further comprising a catalyst system comprising a solvent metal and/or a source of carbon wherein the melting point of the first coating is at least 20 deg C. below that of the catalyst system.

The variables and preferred options as hereinbefore described apply mutatis mutandis to the second and third aspects to the present invention.

DETAILED DESCRIPTION

Diamond seed particles in the size range of about 1 to 100 microns are coated with a metal solvent-based alloy with relatively low melting point by means of an electro- or electroless plating or other method. The solvent metals include nickel, cobalt, chromium, iron and manganese, or combinations of these. The coatings comprise alloys of these with phosphorus, boron or sulphur. Other chemicals, such as oxygen and nitrogen, may also be present as impurities or deliberately incorporated. Preferably the alloy coating has a melting point at atmospheric pressure in the presence of carbon of less than about 1100 deg C. and more preferably less than about 1000 deg C. Phase diagrams can be used to arrive at the optimum ratios of the alloy components in order to minimize the melting points or to achieve some other pre-selected optimum condition.

In one approach, the seed diamonds thus coated with the selected alloy are subsequently subjected to a further coating stage as taught by EP0528195 B1, in which they are coated with graphite and catalyst metal powder in any of various possible configurations.

In another approach, the alloy-coated seed diamonds are positioned within two-dimensional arrays onto discs comprising catalyst metal, graphite or combinations of these, by some placement method (see U.S. Pat. No. 4,547,257).

Upon furnacing the RVC at a temperature above the melting point of the selected coating alloy, but below the melting point of the surrounding catalyst system, the alloy melts and dissipates into the surrounding material, thereby reducing the amount of alloy metal separating the seed diamond from the source graphite. This has the effect of reducing the deleterious effect of the coating on the initial diamond growth conditions and hence the grown diamond properties without the need to modify the synthesis process control conditions to compensate for the existence of a substantial metal coating or cladding on the seed diamond.

Diamond seed particles from 1 micrometer (μ) diameter to 100μ may be clad with low melting metal alloys to a final size convenient for further granule preparation, from approximately 40μ to in excess of 150μ diameter. Preferably diamond seeds of about 20μ-30μ may be clad to a final diameter of approximately 100μ. The term diameter refers to an aggregate diameter of the particle which it will be appreciated are not necessarily spherical.

The low melting alloys include alloys of Ni and Co with P, B and S. These may be conveniently clad or coated onto diamond seed particles using electroless plating processes well known in the art. Ni/P alloys are a preferred low melting alloy system. It is known that the melting point of the Ni alloy can be reduced in essentially a linear manner from 1455 deg C. (for pure Ni), by an increasing P content up to 11 wt % at the eutectic point, at a temperature of 870 deg C. The ternary Ni/P/carbon eutectic is at an even lower temperature of 860 deg C. The useful eutectic compositions and temperatures are given in Table 1.

TABLE 1

| Alloy (Ni/X or Co/X) | Eutectic composition (wt %) | Eutectic Temperature (deg C.) |
|---|---|---|
| Ni/P | 11 | 870 |
| Ni/B | 13.2 | 1018 |
| Ni/S | 25.0 | 510 |
| Co/P | 11.5 | 1023 |
| Co/S | 27.0 | 877 |

The invention will now be described with reference to the following non-limiting examples and FIGS. 1 to 5 which show micrographs of the partially embedded diamond particles at the end of the respective furnace stages. In particular:

Example 1

Figure 1:
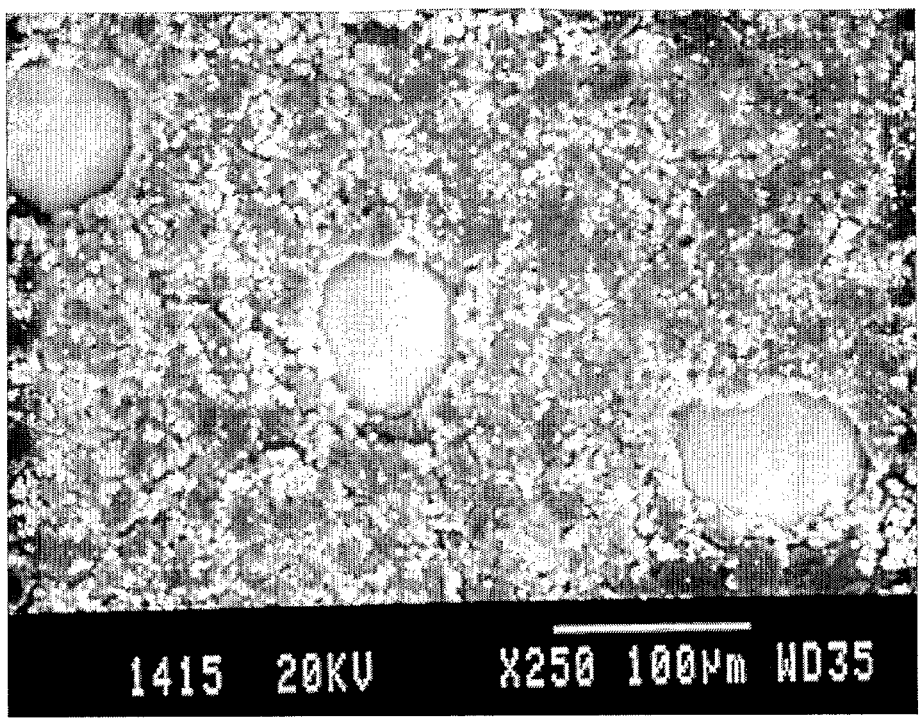
FIG. 1 shows a micrograph of the partially embedded diamond particles after heat treating at 800 deg C.
Figure 2:
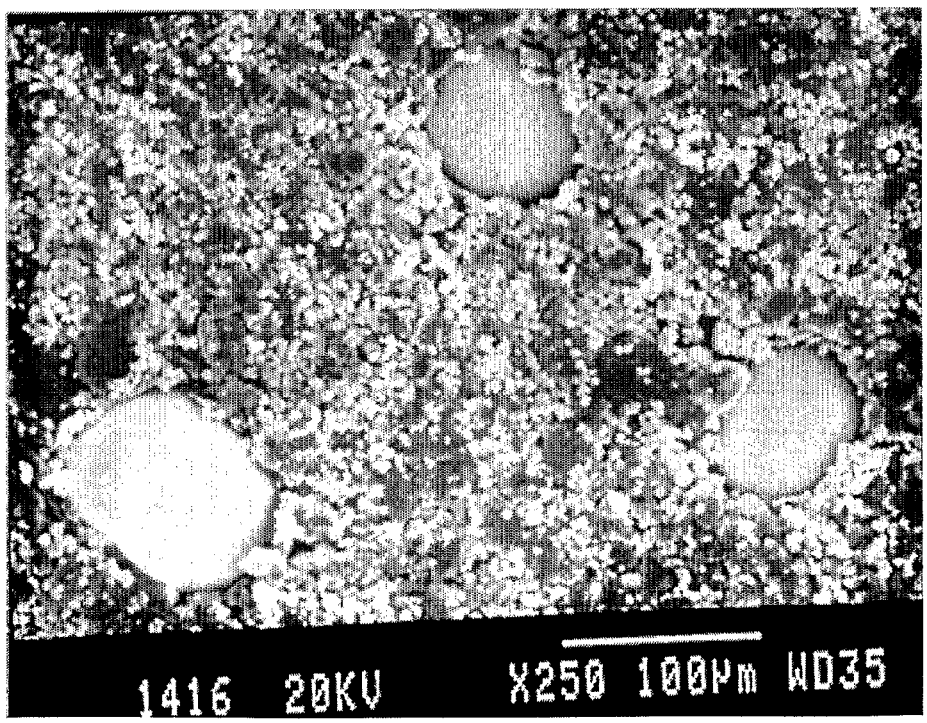
FIG. 2 shows a micrograph of the partially embedded diamond particles after heat treating at 850 deg C.

Nickel phosphorus was clad onto diamond particles of average diameter 20μ using the electroless cladding method. It is well known in the art how to control the P content within the NiP cladding or coating using this method. Practically, the diamond sizes ranged from approximately 5 to 35μ in diameter. About 50 g of this diamond intended as seeds was suspended in about three litres of solution containing about 60 g of $NiCl_2$ salt, 60 g of $NaH_2PO_2$, buffered with 25 g of $CH_3COONa$. The plating conditions were selected to generate a Ni/P composition of the cladding close to the eutectic amount, namely 11 wt % P, in order to have the lowest melting point alloy possible in this system. Care was taken to ensure that plating predominantly occurred on single particles and that particle agglomeration was minimized. The solution was periodically replaced as it became depleted in active reagents. After an extended plating time of 132 hours, almost spherical Ni/P clad particles were obtained with an average diameter of 95μ. The phosphorus content of the Ni cladding was measured to be 10.3 wt % of the total metal mass using a gravimetric method where a magnesium pyrophosphate ($Mg_2P_2O_7$) precipitate is weighed. This method is well known in the art of metal phosphorus alloy analysis.

The Ni/P clad diamond seeds prepared as described above were then coated in Graphite, Ni and Fe suitable for diamond synthesis purposes to form spherical granules suitable for use in the seed array technologies outlined above. The spherical granules were pressed into porous green bodies for use in diamond synthesis processes known in the art, so that a spaced three dimensional array of the clad seeds in a matrix of graphite, Ni and Fe was obtained. These green bodies were treated at 1000 deg C. in a vacuum prior to the diamond synthesis process, this temperature being chosen to be substantially lower than the melting point of the catalyst system (in the region of approximately 1120 deg C. to 1170 deg C.), but greater than that of the Ni/P cladding (in the region of approximately 860 deg C. to 900 deg C.). After heat treatment it was observed that the metal cladding around each seed had melted and diffused into the body of the graphite, Ni, Fe matrix. The spaced three-dimensional array of the diamond seeds in the matrix had not been disturbed. After diamond synthesis procedures, it was observed that exceptional quality, optically clear diamond was generated whereby central blemishes in the grown diamond crystals were minimized. This was found to be superior to cases were pure Ni cladding was employed on the original diamond seed particles.

In order to demonstrate the melting and dissipation of the NiP cladding under heat treatment conditions, several clad seeds, according to the above description, were partially embedded into several discs comprising graphite powders and a blend of Fe and Ni powders in the ratio 70:30. The ratio of graphite to metal was approximately 35:65 by mass. The discs were substantially identical. The powders comprising the discs were held together by methyl cellulose binder. The disc composition and porosity was substantially similar to those of the environment around the clad seeds within the reaction volume or granules during the furnacing (debindering and/or purification) stage. The discs bearing the clad seeds were subjected to furnacing in a hydrogen/nitrogen gas at different temperatures, ranging from below to above the melting point of the cladding alloy in the presence of carbon and at substantially atmospheric pressure, for about 4.5 minutes. The peak temperatures in each case were 800 deg C., 850 deg C., 900 deg C., 1000 deg C. and 1130 deg C.

Figure 3:
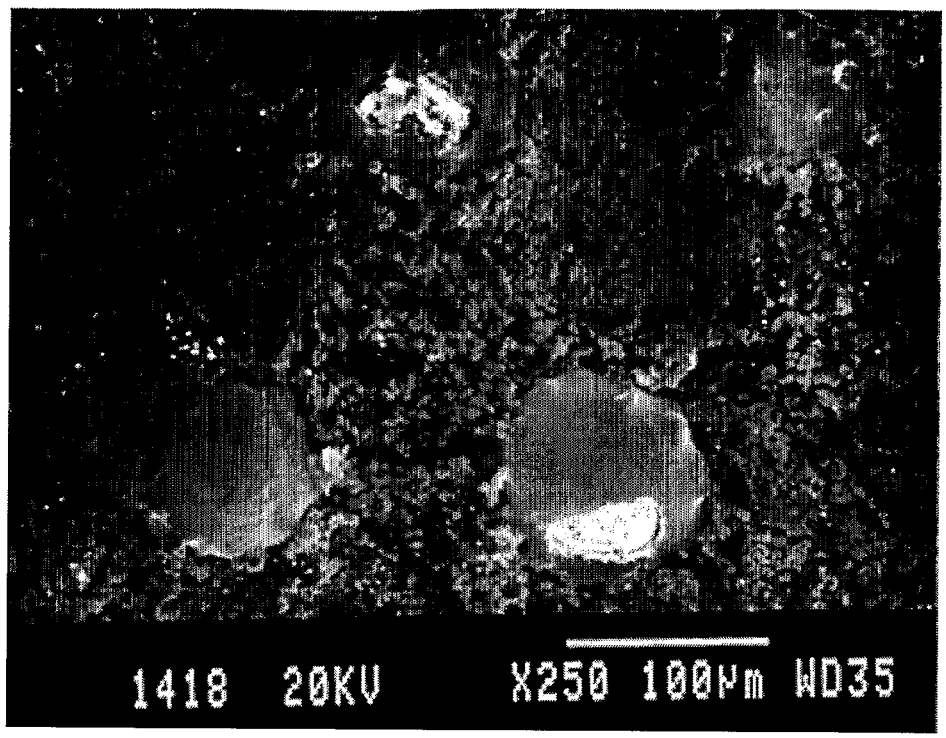
FIG. 3 shows a micrograph of the partially embedded diamond particles after heat treating at 900 deg C.
Figure 4:
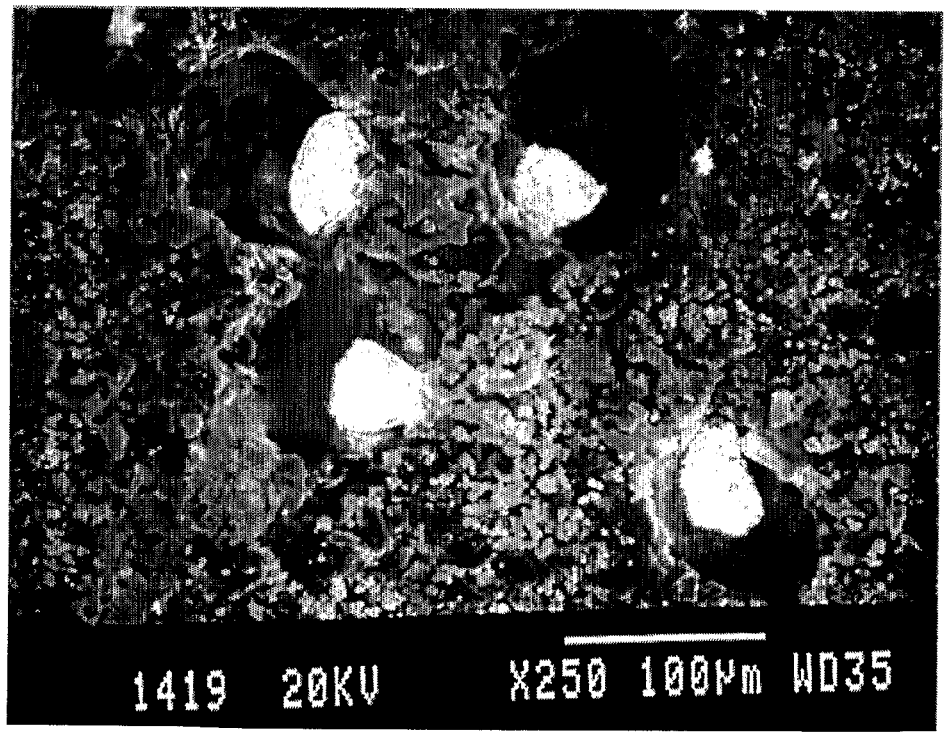
FIG. 4 shows a micrograph of the partially embedded diamond particles after heat treating at 1000 deg C.
Figure 5:
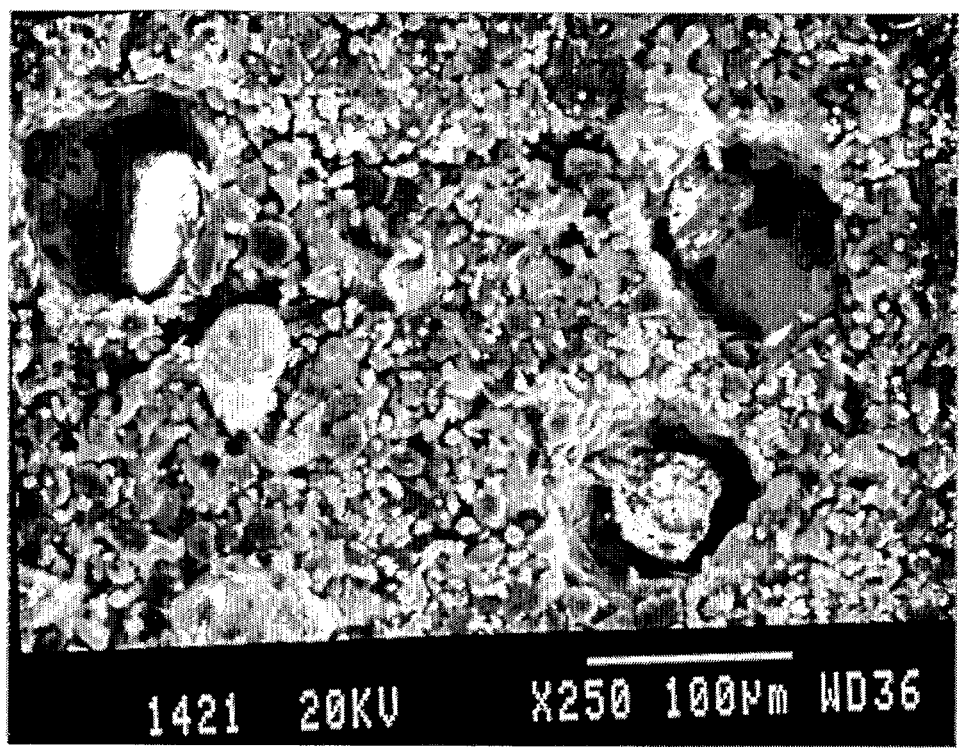
FIG. 5 shows a micrograph of the partially embedded diamond particles after heat treating at 1130 deg C.

FIG. 1 through 5 clearly show that the NiP cladding had begun melting by about 900 deg C. and had fully melted by about 1000 deg C. This is clear from appearance of the faceted diamond surfaces, which have a shiny, reflective appearance in FIGS. 3 to 5 compared to the substantially rounded and matt appearance of the cladding in FIGS. 1 and 2. Furthermore, the Fe and Ni powders have clearly not melted at the temperatures used, which is important. Most significantly, the molten NiP cladding appears to have dissipated into the surrounding porous disc environment (bear in mind that the binder has been substantially removed during the heat treatment, as is required, increasing the disc porosity).

Example 2

A NiB coating with up to 4% B can be deposited on the seed particles using the electroless method using sodium borohydride as reducing agent and at a pH in the range 4 to 5 under the following typical conditions, known in the art:

| | |
|---|---|
| Nickel chloride: | 30 g/l |
| Sodium hydroxide: | 40 g/l |
| Ethylenediamine: | 52 g/l |
| Sodium borohydride: | 1.2 g/l |
| Temperature: | 80-90 deg C. |

Electroless nickel/boron plating is very expensive and the plating baths tend to be unstable stable, especially when sodium borohydride is used.

Example 3

Electroless cobalt/phosphorus plating can only be carried out in an alkaline plating bath. A typical plating bath is:

| | |
|---|---|
| Cobalt chloride: | 30 g/l |
| Sodium hypophosphite: | 20 g/l |
| Sodium citrate: | 35-100 g/l |
| Ammonium chloride: | 50 g/l |
| pH: | 9 (optimum) |
| Temperature: | >85 deg C. |

The higher the pH, the faster the plating rate tends to be. At the optimum pH, the highest plating rate is obtained at a hypophosphite concentration of 40-50 g/l. The optimum sodium citrate and ammonium chloride concentrations to produce a good quality cladding are 100 g/l and 50 g/l, respectively. Cobalt chloride concentrations higher than 30 g/l, have very little overall effect.

Electroless cobalt plating is considerably more expensive than conventional electroless nickel plating.

The invention claimed is:

1. A method for manufacturing of diamond, said method comprising the steps of:
providing a coating comprising a NiP alloy, wherein the P content is in the range of 6 to 14 wt. % of the NiP alloy on a diamond seed to create a coated diamond seed;
situating the coated diamond seed adjacent a catalyst system comprising a solvent metal and a source of carbon; and
subjecting the coated diamond seed and catalyst system to high pressure and high temperature sufficient to induce diamond growth;
wherein the melting point of said coating is at least 20° C. below that of the catalyst system.

2. The method according to claim 1, wherein the coating comprises other chemicals, including but not limited to oxygen and nitrogen.

3. The method according to claim 1 wherein electroless, electrolytic or fluidized bed methods are used for depositing said coating on said diamond seed.

4. The method according to claim 1 wherein the melting point of said alloy in the presence of carbon is at least about 100° C. lower than that of the catalyst system.

5. The method according to claim 1 wherein the thickness of said coating is sufficient to enable handling, granulation, placement or other manipulation of the seed.

* * * * *